United States Patent
Kim et al.

(10) Patent No.: US 10,763,677 B2
(45) Date of Patent: Sep. 1, 2020

(54) CHARGING/DISCHARGING OF BATTERY ENERGY STORAGE SYSTEM USING 3-PHASE TRANSFORMER

(71) Applicant: LG CHEM, LTD., Seoul (KR)

(72) Inventors: Dong Hoe Kim, Daejeon (KR); Chan Min Park, Daejeon (KR); Tae Shin Cho, Daejeon (KR); Jong Min Park, Daejeon (KR); Kil Won Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 447 days.

(21) Appl. No.: 15/447,821

(22) Filed: Mar. 2, 2017

(65) Prior Publication Data

US 2017/0256964 A1    Sep. 7, 2017

(30) Foreign Application Priority Data

Mar. 3, 2016   (KR) .................. 10-2016-0025584
Feb. 13, 2017  (KR) .................. 10-2017-0019535

(51) Int. Cl.
  *H02J 7/00* (2006.01)
  *H02J 7/02* (2016.01)

(52) U.S. Cl.
  CPC .......... *H02J 7/0026* (2013.01); *H02J 7/0013* (2013.01); *H02J 7/0042* (2013.01); *H02J 7/02* (2013.01); *H02J 7/027* (2013.01)

(58) Field of Classification Search
  CPC ...... H02J 7/1423; H02J 7/0024; H02J 7/0065; H02J 7/35; H02J 7/355; H02J 7/02; H02J 7/022; H02J 2207/20; Y02E 60/12; Y02E 10/7005; Y02E 10/7055; Y10T 307/707; H01M 10/465; H01M 16/006
  (Continued)

(56) References Cited

U.S. PATENT DOCUMENTS 5,768,117 A * 6/1998 Takahashi .............. G05F 1/577
                                                    307/82
2005/0116547 A1  6/2005 Lin et al.
(Continued)

FOREIGN PATENT DOCUMENTS

DE    102013206808 A1  10/2014
EP        2804286 A2   11/2014
(Continued)

OTHER PUBLICATIONS

Extended European Search Report for European Application No. 17157738.0, dated Jul. 10, 2017.

*Primary Examiner* — Richard Isla
*Assistant Examiner* — Mohammed J Sharief
(74) *Attorney, Agent, or Firm* — Birch, Stewart, Kolasch & Birch, LLP (57) ABSTRACT

The present invention relates to a battery energy storage system including: a plurality of battery boxes provided with a plurality of battery packs; a plurality of power converter systems respectively connected to the plurality of battery boxes to selectively charge or discharge the plurality of battery boxes through alternating current supplied from an external power source device; a transformer disposed between the external power source device and the plurality of power converter systems; and a controller controlling the plurality of power converter systems to selectively charge or discharge the plurality of battery boxes.

14 Claims, 9 Drawing Sheets

100 - battery energy storage system
110 - charging/discharging device
111 - battery box
112 - power converter system
120 - transformer
130 - controller
140 - monitor device (58) Field of Classification Search
USPC .................................. 320/126, 102, 140
See application file for complete search history.

(56) References Cited

U.S. PATENT DOCUMENTS

| | | | |
|---|---|---|---|
| 2009/0315402 A1 | 12/2009 | Suzuki et al. | |
| 2011/0140649 A1* | 6/2011 | Choi | H01M 10/465 320/101 |
| 2012/0175966 A1* | 7/2012 | Nakashima | H02J 7/0019 307/86 |
| 2012/0217933 A1* | 8/2012 | Abe | H01M 10/3909 320/128 |
| 2012/0242280 A1* | 9/2012 | Suh | H02J 7/022 320/107 |
| 2013/0187605 A1 | 7/2013 | Potts | |
| 2013/0200856 A1* | 8/2013 | Zhang | H01M 10/486 320/150 |
| 2013/0257371 A1* | 10/2013 | Komai | H01M 10/44 320/108 |
| 2014/0015507 A1* | 1/2014 | Park | H04B 1/1607 323/304 |
| 2014/0077595 A1 | 3/2014 | Kakuya et al. | |
| 2014/0340044 A1 | 11/2014 | Kim et al. | |
| 2015/0056475 A1* | 2/2015 | Adrian | H02J 7/0072 429/7 |
| 2015/0069844 A1* | 3/2015 | Wu | H02J 1/102 307/74 |
| 2015/0124506 A1* | 5/2015 | Sahoo | H02M 5/225 363/126 |
| 2016/0013670 A1 | 1/2016 | Tohara et al. | |
| 2016/0023571 A1* | 1/2016 | Wu | B60L 11/1864 320/103 |
| 2016/0079755 A1 | 3/2016 | Triebel et al. | |
| 2016/0352111 A1* | 12/2016 | Arita | H02J 7/0014 |

FOREIGN PATENT DOCUMENTS

| | | |
|---|---|---|
| KR | 10-2009-0045328 A | 5/2009 |
| KR | 10-2011-0067857 A | 6/2011 |
| KR | 10-2015-0062050 A | 6/2015 |
| KR | 10-2015-0106912 A | 9/2015 |

* cited by examiner

100 - battery energy storage system
110 - charging/discharging device
111 - battery box
111a - battery pack
112 - power converter system
120 - transformer

100 - battery energy storage system
110 - charging/discharging device
111 - battery box
112 - power converter system
120 - transformer
130 - controller
140 - monitor device

FIG.3

100 - battery energy storage system
110 - charging/discharging device
111 - battery box
112 - power converter system
120 - transformer
130 - controller
140 - monitor device

: ABNORMAL STATE

100 - battery energy storage system
110 - charging/discharging device
111 - battery box
112 - power converter system
120 - transformer
130 - controller
140 - monitor device

100 - battery energy storage system
110 - charging/discharging device
111 - battery box
112 - power converter system
120 - transformer
130 - controller
140 - monitor device

FIG. 8

100 - battery energy storage system
110 - charging/discharging device
111 - battery box
112 - power converter system
120 - transformer
130 - controller
140 - monitor device

FIG.9

100 - battery energy storage system
110 - charging/discharging device
111 - battery box
112 - power converter system
120 - transformer
130 - controller
140 - monitor device

CHARGING/DISCHARGING OF BATTERY ENERGY STORAGE SYSTEM USING 3-PHASE TRANSFORMER

CROSS-REFERENCE TO RELATED APPLICATION

The present application claims the benefit of the priority of Korean Patent Application Nos. 10-2016-0025584, filed on Mar. 3, 2016, and 10-2017-0019535, filed on Feb. 13, 2017, which are hereby incorporated by reference in their entirety.

TECHNICAL FIELD

The present invention relates to a battery energy storage system, and more particularly, to a battery energy storage system which is capable of operating by linking a plurality of battery packs or by independently (or individually) using the plurality of battery packs.

BACKGROUND ART

In general, a battery energy storage system (BESS) using a secondary battery is used for stabilizing a voltage and frequency of the system as well as is linked with a renewable energy generation system to store surplus energy, discharges the energy stored in the battery to supply the energy to a load when a peak load or a system accident occurs, and attenuates the excessive energy when the system is recovered.

PRIOR ART DOCUMENTS

Patent Documents

[Patent Document 1] Korean Patent Publication No. 10-2015-0106912

DISCLOSURE OF THE INVENTION

Technical Problem

The battery energy storage system according to the related art has a problem in which the whole batteries are not used even though one battery abnormally operates, or the driving of the battery energy storage system has to be stopped.

To solve the above-described problem, the present invention provides a battery energy storage system that is capable of operating by using remaining batteries although one battery abnormally operates, particularly, operating by linking the plurality of battery packs or by independently (or individually) using the plurality of battery packs.

Technical Solution

To achieve the object of the present invention, a battery energy storage system according to a first embodiment of the present invention includes: a plurality of battery boxes provided with a plurality of battery packs; a plurality of power converter systems respectively connected to the plurality of battery boxes to selectively charge or discharge the plurality of battery boxes through alternating current supplied from an external power source device; a transformer disposed between the external power source device and the plurality of power converter systems; and a controller controlling the plurality of power converter systems to selectively charge or discharge the plurality of battery boxes.

When the number of battery boxes and the number of power converter systems are the same, the controller may connect the battery boxes and the power converter systems to one-to-one correspond to each other and thereby to form a plurality of charging/discharging devices, and the plurality of charging/discharging devices may be controlled by the controller to operate to be linked with each other or independently operate.

When the plurality of charging/discharging devices normally operate, the controller may control the plurality of charging/discharging devices to operate to be linked with each other and thereby to perform charging or discharging.

When one of the battery boxes or the power converter systems abnormally operates, the controller may stop the charging/discharging devices, which abnormally operate, so that the charging or discharging is not performed and allow the charging/discharging devices to be independently charged or discharged.

When all the plurality of charging/discharging devices abnormally operate, the controller may stop the plurality of charging/discharging devices so that the charging or discharging is not performed.

When the number of battery boxes and the number of power converter systems are different from each other, the controller may connect the power converter systems to the plurality of battery boxes to charge or discharge all the plurality of battery boxes or individually charge or discharge the plurality of battery boxes through one power converter system.

When at least four battery boxes and two power converter systems are provided, the controller may charge or discharge the two battery boxes through the two power converter systems and stop the remaining battery boxes so that the charging or discharging is not performed.

When at least one of the plurality of battery boxes abnormally operates, the controller may control the plurality of power converter systems to stop the at least one battery box, which abnormally operates, so that the charging or discharging is not performed and to charge or discharge the battery boxes, which normally operate.

When at least one of the plurality of power converter systems abnormally operates, the controller may stop the at least one power converter system, which abnormally operates, and control the power converter systems, which normally operate, to charge or discharge the plurality of battery boxes.

The transformer may include a three-winding transformer.

The controller may control a monitor device to display a connection state between the plurality of battery boxes and the plurality of power converter systems through the monitor device.

At least one of the plurality of battery boxes may have capacity greater than that of each of remaining battery boxes, and each of the remaining battery boxes may have power greater than that of the at least one battery box.

A battery energy storage system according to a third embodiment of the present invention includes: a charging/discharging device including one battery box provided with a plurality of battery packs and a plurality of power converter systems connected to the one battery box in parallel to supply alternating current to the one battery box and thereby to perform charging or discharging; a transformer supplying the alternating current supplied from an external power source device to each of the plurality of power converter systems provided in the charging/discharging device; and a controller controlling the plurality of power converter systems to allow the one battery box to be charged or discharged through remaining power converter systems when one power converter system of the plurality of power converter systems abnormally operates.

When the remaining power converter systems abnormally operate, the controller may control the charging/discharging device to stop an operation of the charging/discharging device.

The transformer may include a three-winding transformer.

The controller may control a monitor device to display the battery box or the charging/discharging device, which abnormally operates, through the monitor device.

Advantageous Effects

The present invention has effects as follows.

First: The battery energy storage system of the present invention may include the power converter systems that selectively charge or discharge the plurality of battery boxes to achieve the continuity in charging or discharging.

Second: In the battery energy storage system of the present invention, the plurality of battery boxes and the plurality of power converter systems are one-to-one correspondingly connected to each other to form the plurality of charging/discharging devices. Thus, the plurality of charging/discharging devices may be linked with each other to perform the charging or discharging or be independently used to perform the charging or discharging.

Third: In the battery energy storage system of the present invention, although one of the plurality of charging/discharging devices abnormally operates, the charging or discharging may be performed through the remaining charging/discharging devices. As a result, the occurrence of the accident may be previously prevented, and the continuity in charging or discharging may be achieved.

Fourth: In the battery energy storage system of the present invention, all the power converter systems are connected to the plurality of battery boxes. Thus, all the plurality of battery boxes may be charged or discharged through one power converter system, or the plurality of battery boxes may be individually charged or discharged.

Fifth: In the battery energy storage system of the present invention, although one of the plurality of battery boxes abnormally operates, the charging or discharging may be performed through the remaining battery boxes. Also, although one of the plurality of power converter systems abnormally operates, the plurality of battery boxes may be charged or discharged through the remaining normal power converter systems. As a result, the continuity in charging or discharging may be achieved.

MODE FOR CARRYING OUT THE INVENTION

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Battery Energy Storage System According to First Embodiment of the Present Invention]

Figure 1:
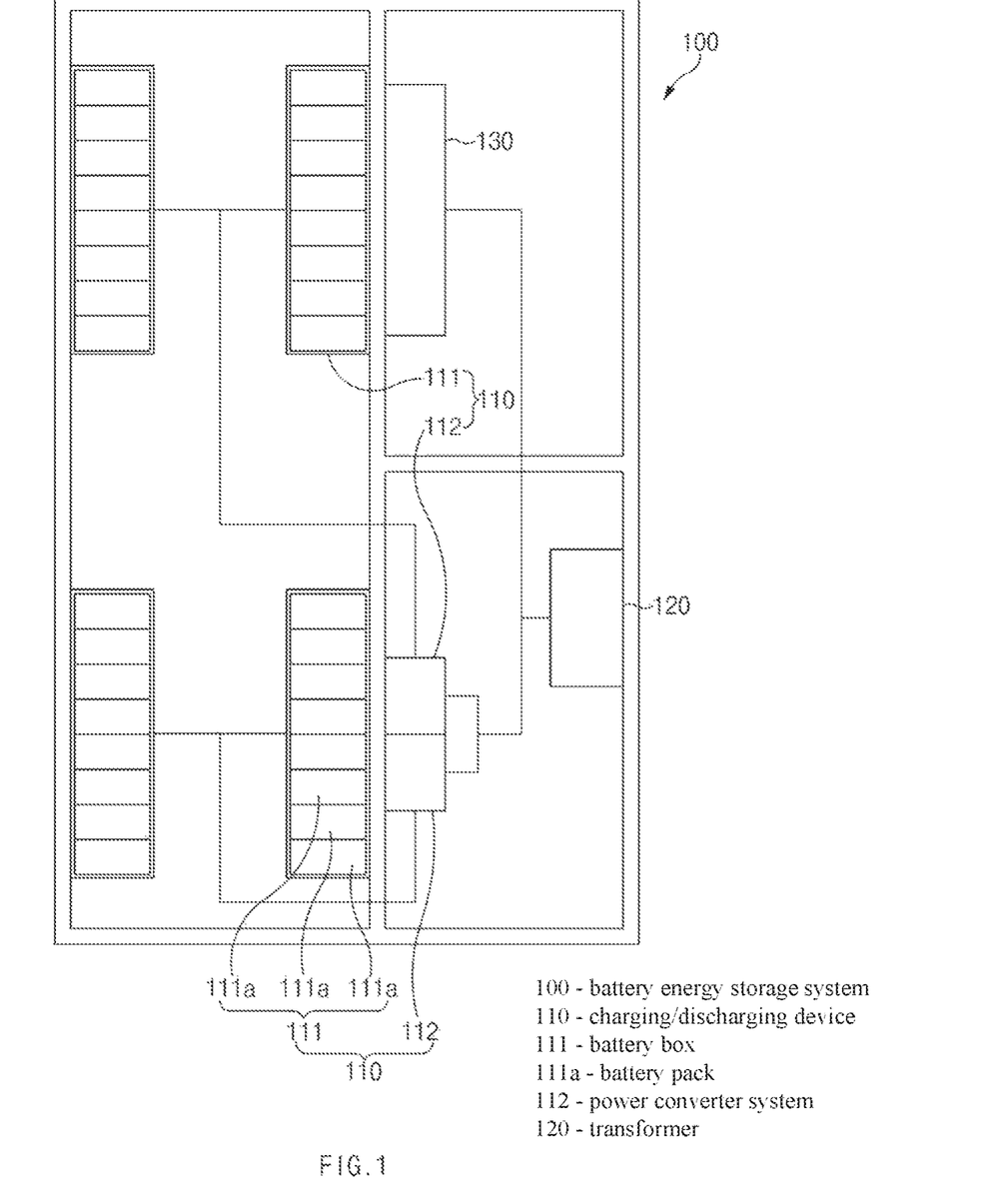
FIG. 1 is a view of a battery energy storage system according to a first embodiment of the present invention.
Figure 2:
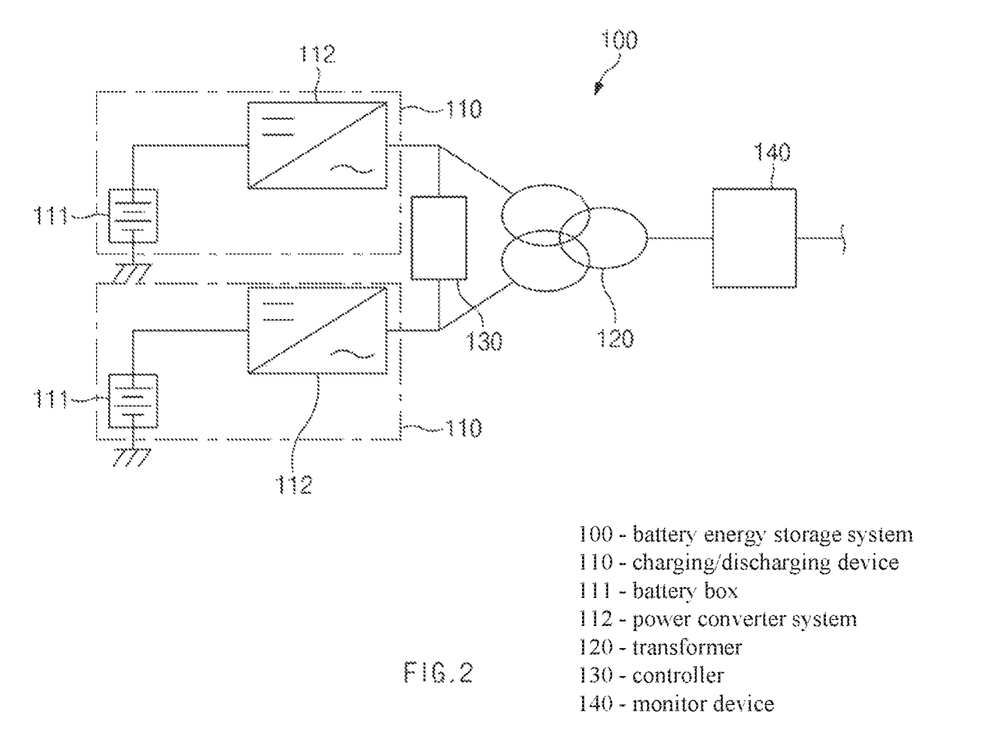
FIG. 2 is a schematic circuit view of the battery energy storage system according to the first embodiment of the present invention.

As illustrated in FIGS. 1 and 2, a battery energy storage system 100 according to a first embodiment of the present invention may include a plurality of battery boxes 111, a plurality of power converter systems (PCSs) 112, a transformer 120, and a controller 130 so as to control selective charging or discharging of the plurality of battery packs.

The plurality of battery boxes 111 are provided with a plurality of battery packs 111a, and the plurality of battery packs 111a are disposed to be connected to each other in series or parallel. Also, the battery packs 111a are provided with battery cells (not shown) connected to each other in series or parallel.

Here, each of the battery boxes has a feature in which, when the plurality of battery packs 111a are connected to each other in parallel, the battery box 111 may increase in capacity, and when the plurality of battery packs 111a are connected to each other in series, the battery box may increase in voltage. Thus, due to the feature, a portion of the plurality of battery boxes 111 may be provided as a battery box 111 having high capacity, and the remaining battery boxes may be provided as battery boxes 111, each of which has a high voltage (power). As a result, the battery boxes may be effectively applied to various working environments.

The plurality of power converter systems 112 may be respectively connected to the plurality of battery boxes 111 to selectively charge or discharge the plurality of battery boxes 111 through alternating current supplied from an external power source device (not shown). Due to the above-described feature, the plurality of power converter systems 112 may charge all the plurality of battery boxes 111 and discharge all the plurality of battery boxes 111. Also, the plurality of power converter systems 112 may charge a portion of the plurality of battery boxes 111, discharge a portion of the plurality of battery boxes 111, and stop the remaining battery boxes 111 so that the charging or discharging does not occur. As a result, continuity in charging or discharging may be achieved, and various patterns with respect to the charging and discharging may be realized.

The transformer 120 is disposed between the external power source device and the plurality of power converter systems 112 to change a voltage or current value of the alternating current so that the alternating current is stably supplied from the external power source device to the plurality of power converter systems 112. Here, a three-winding transformer may be used as the transformer 120. The three-winding transformer may have three sets of windings to stably supply the alternating current to the plurality of power converter systems 112.

The controller 130 may control the plurality of power converter systems 112 so that the plurality of battery boxes 111 are selectively charged or discharged. Thus, the plurality of battery boxes 111 and the plurality of power converter systems 112 may operate to be linked with each other or independently operate through the controller 130.

Particularly, when at least one of the plurality of battery boxes 111 abnormally operates, the controller 130 may control the plurality of power converter systems 112 to stop the at least one battery box 111, which abnormally operates, and to charge or discharge the remaining battery boxes 111.

Also, when at least one of the plurality of power converter systems 112 abnormally operates, the controller 130 may control the power converter systems, which normally operate, to selectively charge or discharge the plurality of, battery boxes 111.

As described above, the controller 130 may control the plurality of power converter systems 112 so that the plurality of battery boxes 111 are selectively charged or discharged, thereby achieving continuity in charging or discharging.

The controller 130 may control the plurality of power converter systems 112 to charge or discharge only the battery box 111 having the high capacity and also charge or discharge only the battery box 111 having the high voltage (power).

The controller 130 may check a normal or abnormal state in real time through a detecting sensor (not shown) mounted on the power converter systems 112 or the battery packs 111a when charging or discharging the battery packs 111a. A temperature detecting sensor or a smoke detecting sensor may be used as the detecting sensor.

The battery energy storage system 100 having the above-described constitutions according to the first embodiment of the present invention will be described with reference to the accompanying drawings.

As illustrated in FIG. 2, in the battery energy storage system according to the first embodiment of the present invention, the number of battery boxes 111 and the number of power converter systems 112 are the same. The battery boxes 111 and the power converter systems 112 are one-to-one correspondingly connected to each other to form a plurality of charging/discharging devices 110. The controller 130 may control the plurality of charging/discharging devices 110 so that the plurality of charging/discharging devices operate to be linked with each other or independently operate.

Here, the plurality of charging/discharging devices 110 may abnormally operate by an external impact or deterioration of the devices. That is, when the battery boxes 111 or the power converter systems 112 abnormally operate, the controller 130 may stop the charging/discharging devices 110 including the battery boxes or the power converter systems, which abnormally operate, and allow the remaining charging/discharging devices 110, which normally operate, to operate for performing the charging or discharging.

Hereinafter, the battery energy storage system 100 according to the first embodiment of the present invention will be described in detail.

When all the Charging/Discharging Devices Normally Operate

Figure 3:
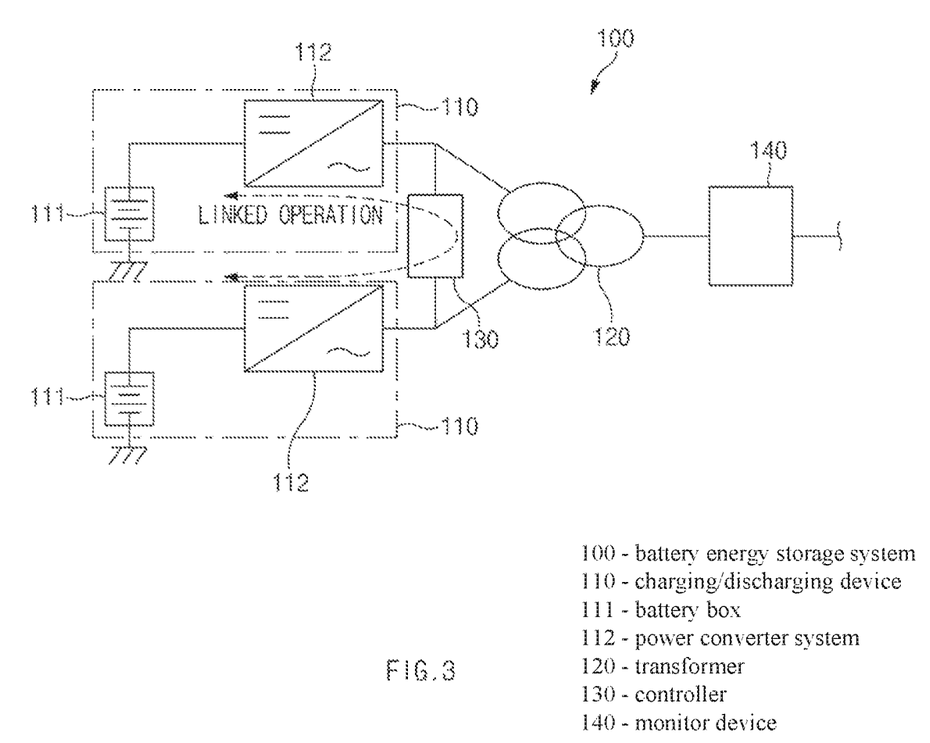
FIG. 3 is a circuit view illustrating a state in which an abnormal operation does not occur in the battery energy storage system according to the first embodiment of the present invention.

As illustrated in FIG. 3, when all the charging/discharging devices 110 normally operate, the controller 130 controls the charging/discharging devices 110 so that the plurality of charging/discharging devices 110 are linked with each other to perform the charging or discharging. That is to say, the charging or discharging may be performed through all the charging/discharging devices 110 to maximize continuity and efficiency in charging and discharging.

Particularly, since the plurality of charging/discharging devices 110 are normal, the controller 130 may construct a charging/discharging system in which the plurality of charging/discharging devices 110 are linked with each other to perform the charging or discharging and construct a charging/discharging system in which the plurality of charging/discharging devices 110 independently operate to perform the charging or discharging.

When One of the Charging/Discharging Devices Abnormally Operates

Figure 4:
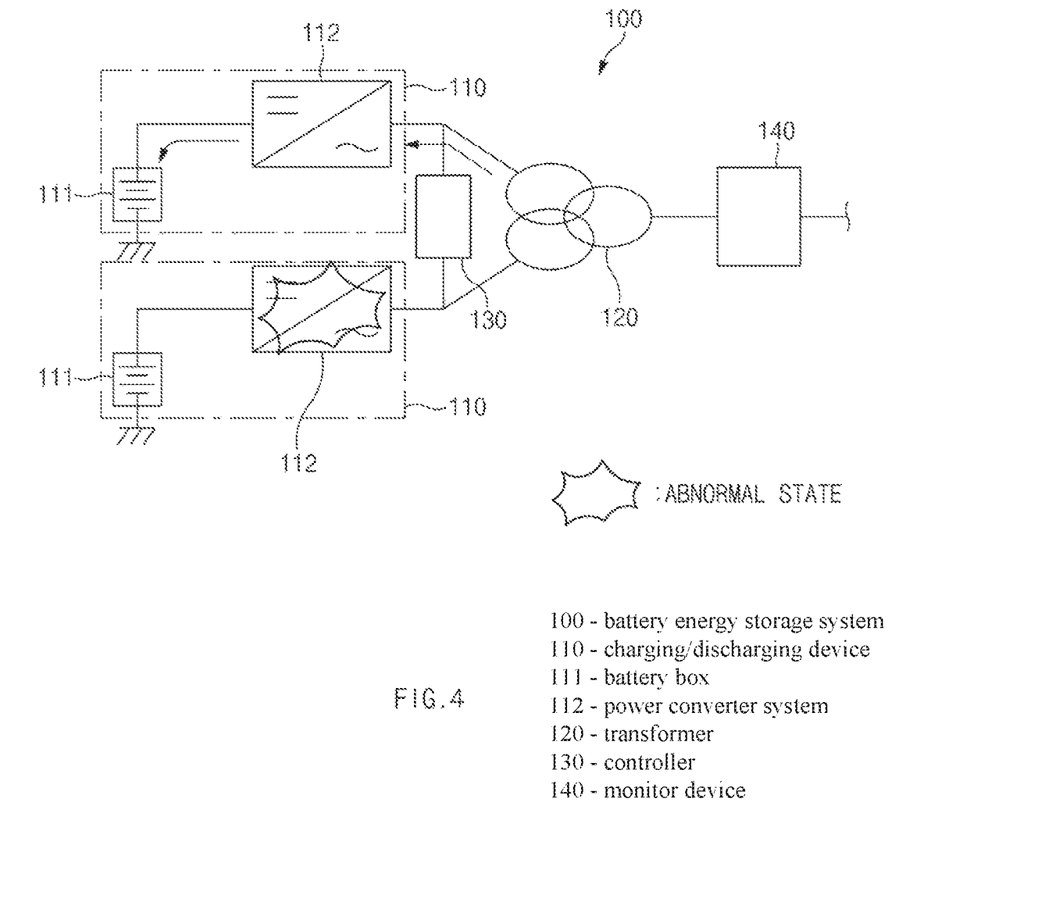
FIG. 4 is a circuit view illustrating a state in which a partial abnormal operation occurs in the battery energy storage system according to the first embodiment of the present invention.

As illustrated in FIG. 4, when one of the charging/discharging devices 110 abnormally operates, the controller 130 may stop an operation of the charging/discharging device 110 including the battery box or the power converter system, which abnormally operates, and allow the charging/discharging devices 110, which normally operates, to independently operate for charging or discharging, thereby achieving the continuity in charging and discharging.

That is to say, the controller 130 may stop the charging/discharging device 100, which abnormally operates, to previously prevent an accident from occurring and allow the charging/discharging devices 110 to operate for charging or discharging and thereby to prevent the system from being stopped.

When all the Charging/Discharging Devices Abnormally Operate

Figure 5:
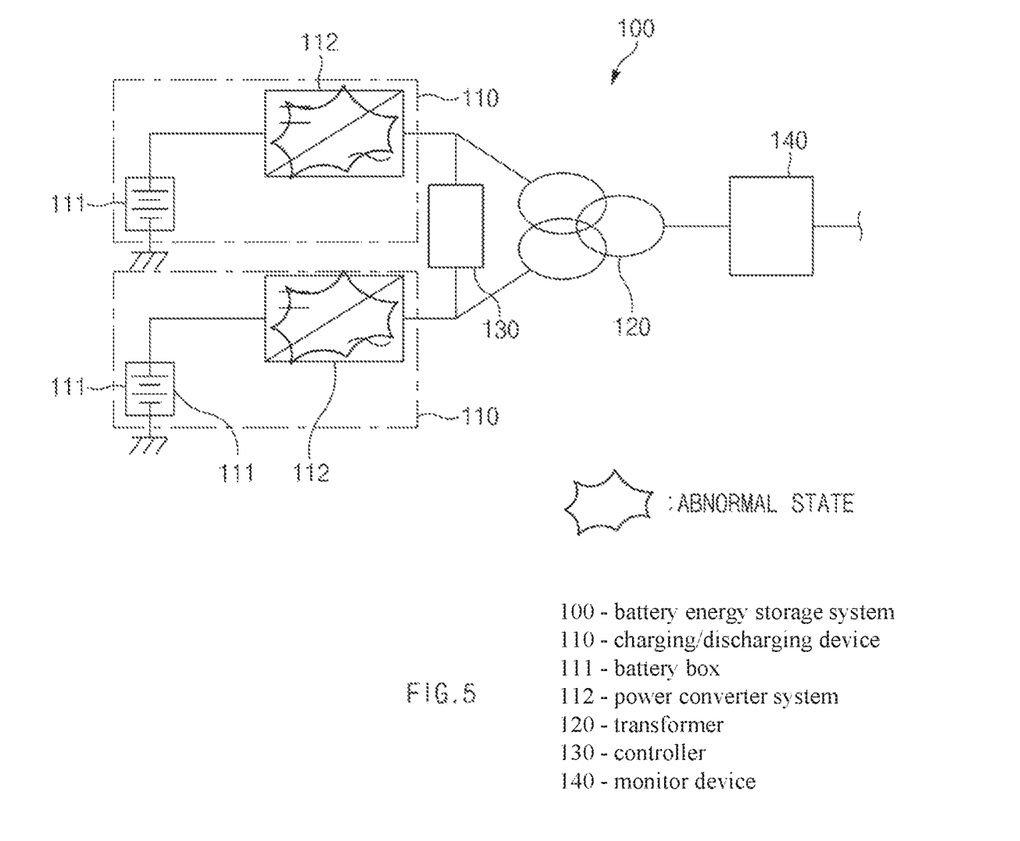
FIG. 5 is a circuit view illustrating a state in which an overall abnormal operation occurs in the battery energy storage system according to the first embodiment of the present invention.

As illustrated in FIG. 5, when all the charging/discharging devices 110 abnormally operates, i.e., when all the battery boxes 111 or the power converter systems 112 provided in the plurality of charging/discharging devices 110 abnormally operate, the controller 130 may stop the operation of all the charging/discharging devices 110 to previously prevent the accident from occurring.

That is to say, since all the charging/discharging devices 110 abnormally operate, the normal operation may be impossible. Thus, the operation of all the charging/discharging devices 110 may be stopped.

Abnormal Operation Display

The controller 130 may control a monitor device 140 to display a connection state between the plurality of battery boxes 111 and the plurality of power converter systems 112 through the monitor device 140. As a result, a worker may easily confirm the present connection state between the batteries and the power converter systems.

Particularly, when the charging/discharging devices 110 abnormally operate, the controller 130 may control the monitor device 140 so that the charging/discharging devices 110 including the battery boxes 111 or the power converter systems 112, which abnormally operate, are displayed through the monitor device 140. As a result, the worker may easily confirm the charging/discharging devices 110, which abnormally operate.

As described above, in the battery energy storage system 100 according to the first embodiment of the present invention, all the charging/discharging devices 110 or only a portion of the charging/discharging devices 110 may operate for charging or discharging, or all the charging/discharging devices 110 may be stopped and thus do not operate for charging or discharging according to whether the charging/discharging devices 110 normally operate or not.

Hereinafter, in description of another embodiment of the present invention, a constitution having a structure and function similar to those of the constitution according to the first embodiment have been given the same reference numeral in the drawings, and thus duplicated description will be omitted.

[Battery Energy Storage System According to Second Embodiment of the Present Invention]

Figure 6:
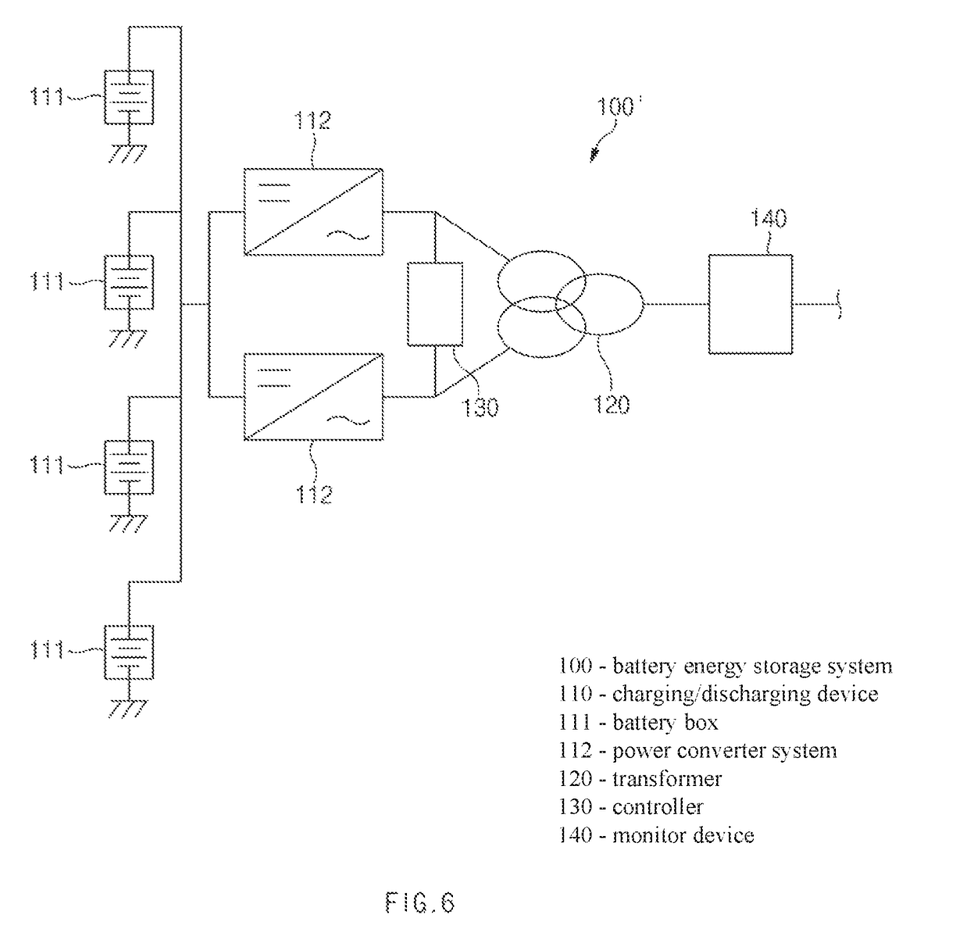
FIG. 6 is a schematic circuit view of a battery energy storage system according to a second embodiment of the present invention.

As illustrated in FIG. 6, in a battery energy storage system 100' according to the second embodiment of the present invention, the number of battery boxes 111 and the number of power converter systems 112 are different from each other. Thus, a controller 130 may connect one power converter system 112 to all the plurality of battery boxes 111 to perform charging or discharging. That is to say, the controller 130 connects one power converter system 112 and the plurality battery boxes 111 to each other in parallel. Thus, all the plurality of battery boxes 111 may be charged or discharged, or the plurality of battery boxes 111 may be individually charged or discharged through one power converter system 112.

Hereinafter, the battery energy storage system 100' according to the second embodiment of the present invention will be described in detail.

When the Number of Battery Boxes and the Number of Power Converter Systems are Different from Each Other As illustrated in FIG. 6, the battery energy storage system 100' according to the second embodiment of the present invention includes at least four battery boxes 111 and two power converter systems 112. As a result, the controller 130 may charge or discharge the two battery boxes through the two power converter systems 112 and stop the remaining battery boxes 111 so that the charging or discharging is not performed. Thus, the charging or discharging of the plurality of battery boxes 111 may be performed at the same time, or only the required battery boxes 111 may be charged or discharged. As a result, the battery boxes 111 may extend in lifespan, and the charging or discharging may be performed in various patterns.

When One of the Battery Boxes Abnormally Operates

When at least one of the plurality of battery boxes 111 abnormally operates, the controller 130 may control the plurality of power converter systems 112 to stop the at least one battery box 111, which abnormally operates, so that the charging or discharging is not performed and to charge or discharge the battery boxes 111, which normally operate. Thus, the charging or discharging may be performed by using only one battery box 111, which normally operates. As a result, the continuity in charging and discharging may be achieved.

When at Least One of the Power Converter Systems Abnormally Operates

When at least one of the power converter systems 112 abnormally operates, the controller 130 may stop the at least one power converter system 112, which abnormally operates, and control the power converter systems 112, which normally operate, to charge or discharge the plurality of battery boxes 111. Thus, the plurality of battery boxes 111 may be charged or discharged by using only one power converter system. As a result, the continuity in charging and discharging may be achieved.

[Battery Energy Storage System According to Third Embodiment of the Present Invention]

Figure 7:
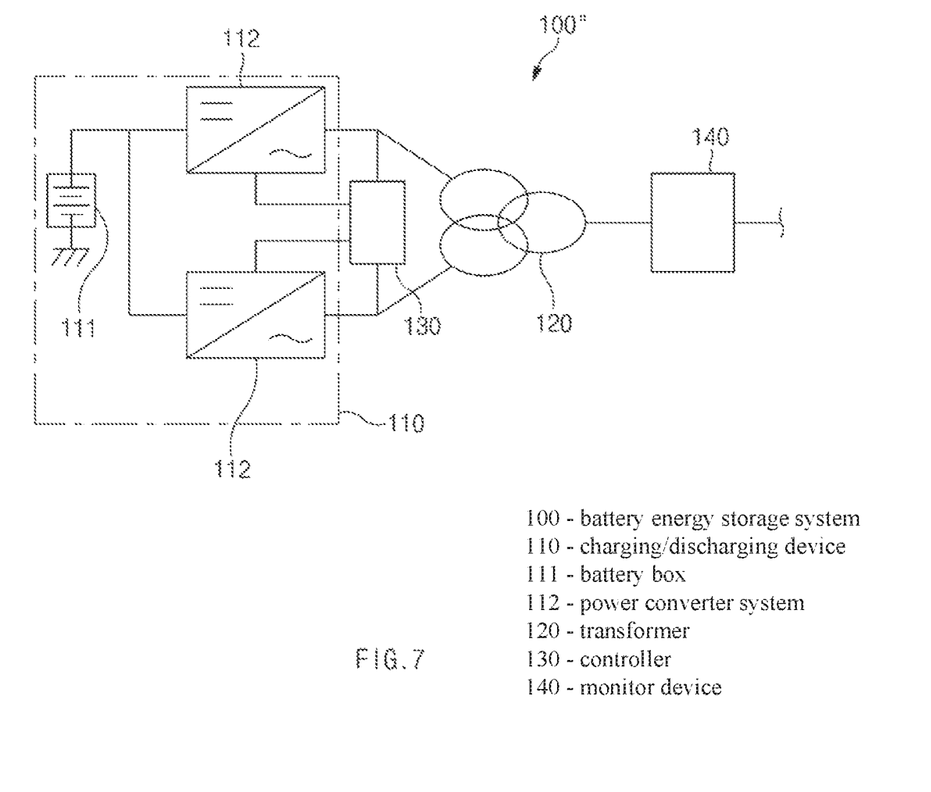
FIG. 7 is a schematic circuit view of a battery energy storage system according to a third embodiment of the present invention.

As illustrated in FIG. 7, a battery energy storage system 100" according to the third embodiment of the present invention includes one battery box 111 provided with a plurality of battery packs 111a, a charging/discharging device 110 provided with a plurality of power converter systems 112 connected to the one battery box 111 in parallel and supplying alternating current to the one battery box 111 to perform charging or discharging, a transformer 120 supplying the alternating current supplied from an external power source device to each of the plurality of power converter systems 112 provided in the charging/discharging device 110, and a controller 130 controlling the one battery box 111 to charge or discharge the one battery box 111 through the remaining power converter systems 112 when one power converter system 112 of the plurality of power converter systems 112 abnormally operates.

That is, in the battery energy storage system 100" according to the third embodiment of the present invention, the plurality of power converter systems may be connected to one battery box 111 to charge or discharge the battery box 111 through the remaining power converter systems 112 although one power converter system 112 abnormally operates.

Hereinafter, the battery energy storage system 100" according to the third embodiment of the present invention will be described in detail.

When all the Power Converter Systems Normally Operate

Figure 8:
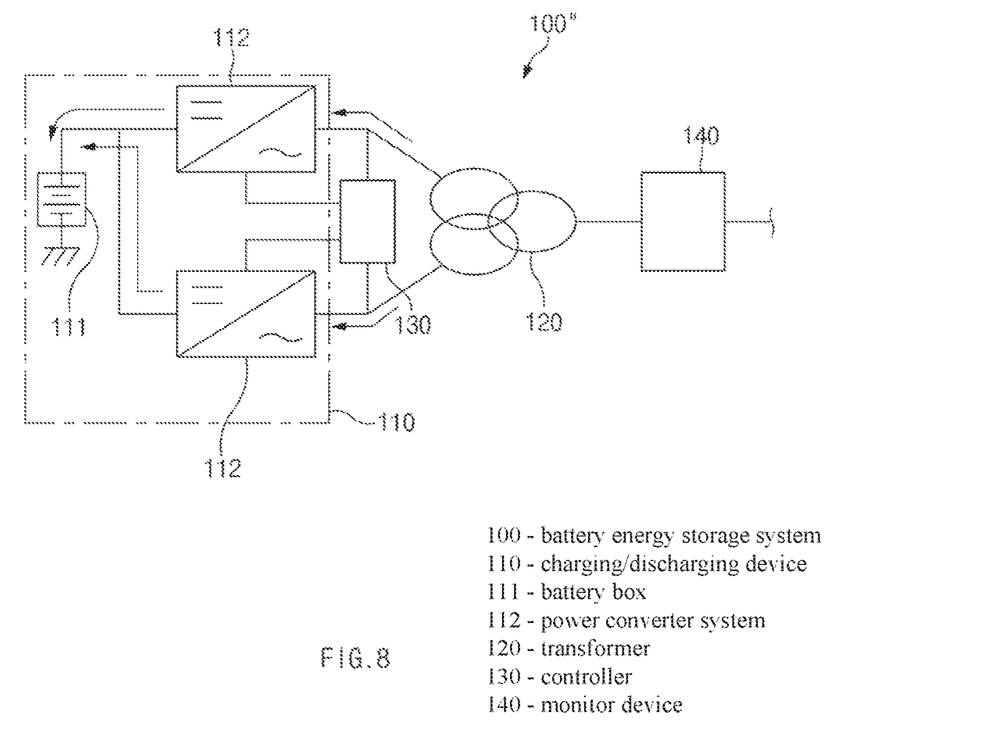
FIG. 8 is a circuit view illustrating a state in which an abnormal operation does not occur in the battery energy storage system according to the third embodiment of the present invention.

The battery energy storage system 100" according to the third embodiment of the present invention includes a charging/discharging device 110 including one battery box 111 and two power converter systems 112. As illustrated in FIG. 8, the controller 130 may control the plurality of power converter systems 112 to charge or discharge the battery box 111 when all the power converter systems 112 normally operate.

When One of the Plurality of Power Converter Systems Abnormally Operates

Figure 9:
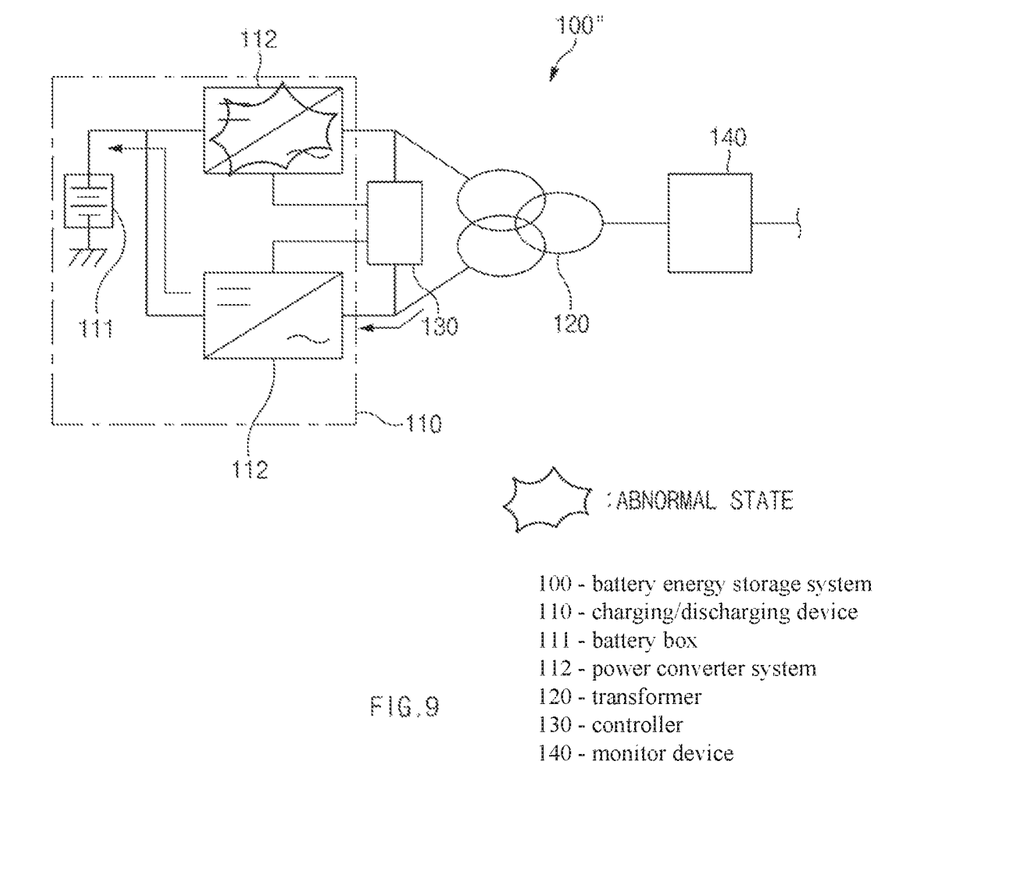
FIG. 9 is a circuit view illustrating a state in which a partial abnormal operation occurs in the battery energy storage system according to the third embodiment of the present invention.

As illustrated in FIG. 9, when at least one of the plurality of power converter systems 112 abnormally operates, the controller 130 may block alternating current to the at least one power converter system 112, which abnormally operates, and charges or discharge the battery box 111 through the power converter systems 112, which normally operate.

When all the Plurality of Power Converter Systems Abnormally Operate

When all the plurality of power converter systems abnormally operate, the controller 130 may stop an operation of the charging/discharging device 110 to prevent an accident from occurring.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

DESCRIPTION OF SYMBOLS

100: Battery energy storage system
110: Charging/discharging device

111: Battery box
111a: Battery pack
112: Power converter system
120: Transformer
130: Controller

The invention claimed is:

1. A battery energy storage system comprising:
a plurality of battery boxes provided with a plurality of battery packs, wherein each of the plurality of battery boxes is connected to each other in parallel;
a plurality of power converter systems respectively connected to the plurality of battery boxes to selectively charge or discharge the plurality of battery boxes through alternating current supplied from an external power source device;
a transformer disposed between the external power source device and the plurality of power converter systems, the transformer being directly connected in series to each of the plurality of power converter systems by a respective terminal;
a controller controlling the plurality of power converter systems to selectively charge or discharge the plurality of battery boxes, the controller being directly connected to nodes located at the respective terminal between each of the plurality of power converter systems and the transformer; and
a monitor device configured to display a connection state between the plurality of battery boxes and the plurality of power converter systems,
wherein the transformer is connected directly between the monitor device and the controller,
wherein the transformer has exactly three sets of windings to stably supply the alternating current to the plurality of power converter systems,
wherein the plurality of power converter systems are connected to each other in parallel, and
wherein each of the plurality of power converter systems is connected in series to the plurality of battery boxes and is configured to individually charge or discharge each of the plurality of battery boxes or to charge or discharge all of the plurality of battery boxes.

2. The battery energy storage system of claim 1, wherein, when the number of battery boxes and the number of power converter systems are the same, the controller connects the battery boxes and the power converter systems to one-to-one correspond to each other and thereby to form a plurality of charging/discharging devices, and
the plurality of charging/discharging devices are controlled by the controller to operate to be linked with each other or independently operate.

3. The battery energy storage system of claim 2, wherein, when the plurality of charging/discharging devices normally operate, the controller controls the plurality of charging/discharging devices to operate to be linked with each other and thereby to perform charging or discharging.

4. The battery energy storage system of claim 2, wherein, when one of the battery boxes or the power converter systems abnormally operates, the controller stops the charging/discharging devices, which abnormally operate, so that the charging or discharging is not performed and allows the charging/discharging devices to be independently charged or discharged.

5. The battery energy storage system of claim 2, wherein, when all the plurality of charging/discharging devices abnormally operate, the controller stops the plurality of charging/discharging devices so that the charging or discharging is not performed.

6. The battery energy storage system of claim 1, wherein, when the number of battery boxes and the number of power converter systems are different from each other, the controller connects the power converter systems to the plurality of battery boxes to charge or discharge all the plurality of battery boxes or individually charge or discharge the plurality of battery boxes through one power converter system.

7. The battery energy storage system of claim 6, wherein, when at least four battery boxes and two power converter systems are provided, the controller charges or discharges the two battery boxes through the two power converter systems and stops the remaining battery boxes so that the charging or discharging is not performed.

8. The battery energy storage system of claim 6, wherein, when at least one of the plurality of battery boxes abnormally operates, the controller controls the plurality of power converter systems to stop the at least one battery box, which abnormally operates, so that the charging or discharging is not performed and to charge or discharge the battery boxes, which normally operate.

9. The battery energy storage system of claim 6, wherein, when at least one of the plurality of power converter systems abnormally operates, the controller stops the at least one power converter system, which abnormally operates, and controls the power converter systems, which normally operate, to charge or discharge the plurality of battery boxes.

10. The battery energy storage system of claim 1, wherein the controller controls the monitor device to display a connection state between the plurality of battery boxes and the plurality of power converter systems through the monitor device.

11. The battery energy storage system of claim 1, wherein at least one of the plurality of battery boxes has capacity greater than that of each of remaining battery boxes, and
each of the remaining battery boxes has power greater than that of the at least one battery box.

12. A battery energy storage system comprising:
a charging/discharging device comprising only one battery box provided with a plurality of battery packs and a plurality of power converter systems connected to each other in parallel and each of the plurality of power converter systems is connected in series to the one battery box to supply alternating current to the one battery box and thereby to perform charging or discharging;
a transformer supplying the alternating current supplied from an external power source device to each of the plurality of power converter systems provided in the charging/discharging device, the transformer being directly connected in series to each of the plurality of power converter systems by a respective terminal;
a controller controlling the plurality of power converter systems to allow the one battery box to be charged or discharged through remaining power converter systems when one power converter system of the plurality of power converter systems abnormally operates; and
a monitor device configured to display a connection state between the plurality of battery boxes and the plurality of power converter systems,
wherein the transformer is connected directly between the monitor device and the controller,
wherein the controller is directly connected to nodes located at the respective terminal between each of the plurality of power converter systems and the transformer, wherein the transformer has exactly three sets of windings to stably supply the alternating current to the plurality of power converter systems, and wherein each of the plurality of power converter systems is configured to charge or discharge the one battery box.

13. The battery energy storage system of claim 12, wherein, when the remaining power converter systems abnormally operate, the controller controls the charging/discharging device to stop an operation of the charging/discharging device.

14. The battery energy storage system of claim 12, wherein the controller controls the monitor device to display the battery box or the charging/discharging device, which abnormally operates, through the monitor device.

* * * * *